(12) United States Patent
Swain

(10) Patent No.: US 6,381,345 B1
(45) Date of Patent: *Apr. 30, 2002

(54) METHOD AND APPARATUS FOR DETECTING EYE LOCATION IN AN IMAGE

(75) Inventor: Cassandra Turner Swain, Aberdeen, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/867,728

(22) Filed: Jun. 3, 1997

(51) Int. Cl.$^7$ .................................................. G06K 9/00
(52) U.S. Cl. ....................................... 382/117; 351/206
(58) Field of Search ................................. 382/100, 115, 382/117, 118, 171, 181, 190, 254, 255, 256, 260, 261, 266, 274, 324; 40/416, 425; 348/78; 351/200, 206, 209, 210–215; 396/18, 51, 158; 424/571; 434/271; 446/389, 392; 600/318, 558; 606/5

(56) References Cited

U.S. PATENT DOCUMENTS

| | | | | |
|---|---|---|---|---|
| 4,768,088 A | * | 8/1988 | Ando | 382/118 |
| 4,822,162 A | * | 4/1989 | Richardson et al. | 351/243 |
| 5,016,282 A | * | 5/1991 | Tomono et al. | 382/117 |
| 5,293,427 A | * | 3/1994 | Ueno et al. | 382/103 |
| 5,407,391 A | | 4/1995 | Monroe et al. | 472/61 |
| 5,432,863 A | * | 7/1995 | Benati et al. | 382/167 |
| 5,450,504 A | * | 9/1995 | Calia | 382/118 |
| 5,537,662 A | * | 7/1996 | Sato et al. | 345/435 |
| 5,689,575 A | * | 11/1997 | Sako et al. | 382/118 |
| 5,719,951 A | * | 2/1998 | Shackleton et al. | 382/118 |
| 5,781,650 A | * | 7/1998 | Lobo et al. | 382/118 |
| 5,802,220 A | * | 9/1998 | Black et al. | 382/276 |
| 5,917,733 A | * | 6/1999 | Bangham | 382/218 |

OTHER PUBLICATIONS

Russ, The Image Processing Handbook, 2nd Edition, 1994, "Correcting Image Defects", pp. 151–174.*

Gloria Chow et al., "Towards a System for Automatic Facial Feature Detection", Pattern Recognition, vol. 26, No. 12, Dec. 26, 1993, pp. 1739–1755.

Yankang Wang et al., "Automatic Extraction of Eye and Mouth Fields from Monochrome Face Image Using Fuzzy Technique", IEEE International Conference on Universal Personal Communications, 1995 pp. 778–782.

Canadian Office Action, Jul. 26, 2000, referencing U.S. Patent 5,407, 391.

Wang et al., "Iterative De$^x$□urrign for CT Metal Artifact Reduction", IEEE Transactions on Medical Imaging, vol. 15, No. 5, Oct. 1996, p. 657–663.*

Oya et al., "Active Eye Sensing System", IECON '93, Industrial Electronics, 1993, pp. 1718–1713.*

* cited by examiner

*Primary Examiner*—Jayanti K. Patel
(74) *Attorney, Agent, or Firm*—Kenyon & Kenyon

(57) ABSTRACT

A simple method for segmenting eyes and extracting parameters enables further processing of the image to enable a person to appear to be making eye contact with another via a video conferencing system. This method is a first step for eye synthesis and gaze detection because it can automatically extract select eye parameters useful to these processes. Its advantage is that no a priori information is necessary to segment eyes, unlike modeling and neural network methods. The method of the present invention first blurs the image to make it easier to determine the location of the two eye regions in the image. The eyebrows are then eliminated based on the located eye regions. The eyes are then segmented and the eye parameters are extracted from the resulting image According to the present invention, the process applies a Gaussian filter, h(x, y), where g(x, y) is the resulting image and ƒ(x, y) is the original image.

22 Claims, 3 Drawing Sheets

"SEAN" "SEAN" "SEAN" "SEAN"

"SANDY" "SANDY" "SANDY" "SANDY"

METHOD AND APPARATUS FOR DETECTING EYE LOCATION IN AN IMAGE

BACKGROUND OF THE INVENTION

The present invention relates generally to methods and apparatuses for processing images, and more particularly to a method and apparatus for processing an image that includes detecting the location of eyes in a video facial image.

In desktop video conferencing systems for obvious reasons, the camera is usually located somewhere other than the center of the screen on which the image of the other conferee is being presented. Preferably the camera is located even out of the peripheral vision of the user to keep from being obtrusive. As a natural consequence, even when the viewer is looking directly at the screen, the viewer appears to the other conferee to be gazing inattentively off into space, which can be very distracting to the other conferee. Obviously, the viewer could look into the camera the entire time, but this would mean that the viewer would miss much of the information being presented on the screen.

As a result of the camera and screen being located in different positions, the eye movement in video conferencing systems does not match in-person meetings. However, eye contact is extremely important in interpersonal communications. Nevertheless, before video conferencing systems can replace these face-to-face meetings, it must create the look and feel of face-to-face meetings.

Attempts have been made to improve the look and feel of video conferencing systems to that which equals that of face-to-face meetings. In this area, approaches proposed to solve the eye-contact (also known as gaze tracking) problem have employed devices such as electronic shutters and half-reflected mirrors to make the camera physically or optically point at the user. While somewhat effective, these approaches are expensive and inconvenient. Expense is particularly an issue for those systems that expect to be deployed on individual personal computers or workstations due to the sheer numbers involved Inconvenience is also an issue in that people will not use systems that are awkwardly designed and implemented, which defeats the entire purpose of video conferencing systems.

To attempt to solve the gaze tracking problem, one can modify the image portion of the eyes so that the eyes are centered on the camera location rather than the screen. This requires processing of the pixels in the eyes to reorient them so they appear to be looking at the other person. Unfortunately, to perform this image processing, one must first detect the location of the eyes in the image, as only the eyes are processed in this manner.

Some approaches have employed headgear or sensors to detect the position of the eyes, which requires the user to remain very still. Both of these approaches are highly intrusive to the user. For the reasons discussed immediately above, most users will not wear headgear.

Another approach compares a library of models against the image until a match is found. This requires a database of models and a large amount of processing. As video conferencing is a live transmission, any large amount of processing is an impairment to implementation.

Yet another approach applies neural networks to determine the location of the eyes. In this case, neural networks are trained using reduced resolution images to find eyes. As with all neural networks, this requires training of the network. Training a neural network is a non-trivial problem, and can often delay or prevent implementation of a network in practical applications.

The present invention is therefore directed to the problem of developing a method and apparatus for detecting the location of eyes in an image that is simple and can be implemented in a video conferencing system.

SUMMARY OF THE INVENTION

The present invention solves this problem by first blurring the image before extracting the eye regions, eliminating the eyebrows in the eye regions, segmenting the eyes, and then extracting the eye parameters.

According to the method of the present invention, the image is first blurred using a Gaussian filter, such as:

$$g(x, y) = \frac{1}{\sum h(x, y)} \sum_x \sum_y f(x, y) h(x, y).$$

Next, the eyes are located within the image. Within this step, first, the search is limited to the center of the image, as the eyes are usually located near the center. Then, the contrast between the dark and light areas is used to locate and identify the eye regions. The next step returns to the original image, within which one can identify the eyes and eyebrows relatively easily. In this step, the eyebrows are removed by relying upon the fact that they are usually above the eyes. That which remains are the eyes. The next step is to segment the eyes into its constituent parts—the iris, the rounded corners and the whites of the eyes. This is accomplished using the intensity according to the following formula:

$$s(x, y) = \begin{cases} \text{eye white} & \text{if } g(x, y) > T \\ \text{iris, corner} & \text{otherwise} \end{cases}.$$

In this case, the threshold is set high enough to segment all iris colors, but low enough to separate the entire white area. Next, the dark areas are identified as dark regions and the eye corners and irises are labeled at intensity 255 and the whites at intensity 0. Next, the eye parameters are extracted, which includes the iris radius, the iris center position, the four eyelid positions (both corners and upper and lower lids).

An apparatus for implementing the method of the present invention includes a digital camera for capturing the image and a processor. The processor first blurs the image to determine the location of the eyes, then extracts the eye regions and eliminates the eyebrows in the eye regions, segments the eyes, and then extracts the eye parameters. These eye parameters are then available for use by other programs or processors.

DETAILED DESCRIPTION

The present invention provides a simple approach for detecting the location of eyes in an image. Among other things, this approach can be applied to video conferencing systems, which places limits on the amount of processing and storage retrieval due to the real-time nature of the application. According to the present invention, no training is needed as with neural networks, and no models are necessary to find eyes. Eyes are located and segmented in an intensity-based approach using image blur. The results of this work can be used for gaze detection, as well as face coding.

Figure 1:
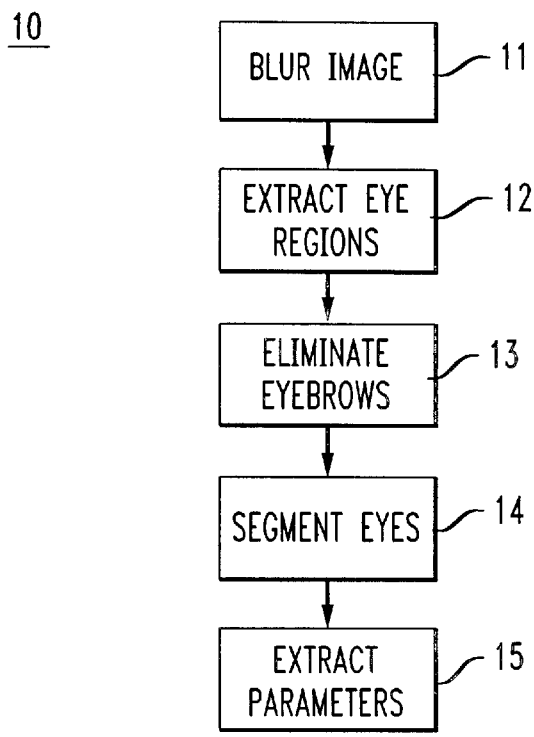
FIG. 1 depicts a flow chart of the method of the present invention.

FIG. 1 shows the algorithm 10 of the present invention. As discussed below, the process of the present invention 10 begins with the step 11 of blurring the image. The nature of the eyes makes it easier to detect them in a blurred image than in the original focused image. So, prior to determining the location of the eyes, the image is blurred.

Next, in step 12 the process of the present invention 10 extracts the eye regions from the original image using the location detected in the first step. The eye regions are then processed as follows.

In step 13, the eyebrows are removed using the assumption that they usually occur above the eyes, and that a light contrast region lies between them and the eyes, i.e., the dark region above the first dark region is removed.

In step 14, the eyes are then segmented into their constituent parts.

Finally, in step 15 the eye parameters are detected.

Blurring

The first step 11 in the process of the present invention is to blur the image. While different techniques for blurring will suffice, the inventor has determined that a Gaussian filter performs well for this applications, The Gaussian filter of the present invention, h(x, y), is defined according to the following equation:

$$g(x, y) = \frac{1}{\sum h(x, y)} \sum_x \sum_y f(x, y)h(x, y)$$

where g(x, y) is the resulting image and ƒ(x, y) is the original image.

One exemplary embodiment of the function h(x,y) is a gaussian filter in the form of a 15×15 matrix, such as:

$$h(x, y) = \begin{bmatrix} 2 & 2 & 3 & 4 & 5 & 5 & 6 & 6 & 6 & 5 & 5 & 4 & 3 & 2 & 2 \\ 2 & 3 & 4 & 5 & 7 & 7 & 8 & 8 & 8 & 7 & 7 & 5 & 4 & 3 & 2 \\ 3 & 4 & 6 & 7 & 9 & 10 & 10 & 11 & 10 & 10 & 9 & 7 & 6 & 4 & 3 \\ 4 & 5 & 7 & 9 & 10 & 12 & 13 & 13 & 13 & 12 & 10 & 9 & 7 & 5 & 4 \\ 5 & 7 & 9 & 11 & 13 & 14 & 15 & 16 & 15 & 14 & 13 & 11 & 9 & 7 & 5 \\ 5 & 7 & 10 & 12 & 14 & 16 & 17 & 18 & 17 & 16 & 14 & 13 & 10 & 7 & 5 \\ 6 & 8 & 10 & 13 & 15 & 17 & 19 & 19 & 19 & 17 & 15 & 13 & 10 & 8 & 6 \\ 6 & 8 & 11 & 13 & 16 & 18 & 19 & 20 & 19 & 18 & 16 & 13 & 11 & 8 & 6 \\ 6 & 8 & 10 & 13 & 15 & 17 & 19 & 19 & 19 & 17 & 15 & 13 & 10 & 8 & 6 \\ 5 & 7 & 10 & 12 & 14 & 16 & 17 & 18 & 17 & 16 & 14 & 13 & 10 & 7 & 5 \\ 5 & 7 & 9 & 11 & 13 & 14 & 15 & 16 & 15 & 14 & 13 & 11 & 9 & 7 & 5 \\ 4 & 5 & 7 & 9 & 10 & 12 & 13 & 13 & 13 & 12 & 10 & 9 & 7 & 5 & 4 \\ 3 & 4 & 6 & 7 & 9 & 10 & 10 & 11 & 10 & 10 & 9 & 7 & 6 & 4 & 3 \\ 2 & 3 & 4 & 5 & 7 & 7 & 8 & 8 & 8 & 7 & 7 & 5 & 4 & 3 & 2 \\ 2 & 2 & 3 & 4 & 5 & 5 & 6 & 6 & 6 & 5 & 5 & 4 & 3 & 2 & 2 \end{bmatrix}$$

The resulting pixel image is the blurred image which is used in the next step for locating the eye regions.

Locating the Eye Regions

In this step 12, the two criteria used to locate these regions are relative position and contrast. In the video conferencing application, eye positions are generally near the image center. Therefore, the search of the image is limited to this area.

One embodiment of the present invention limits the search to an area defined by the middle third in the vertical direction and the middle third in the horizontal direction. Actually, the data used by the inventor was skewed in the horizontal direction. As a result, the inventor limited the search in the horizontal direction to the region between 25% and 60% of the horizontal pixels.

Because the eyes are set in sockets, the eyes appear shadowed in images. The consequence of blurring the image is that this shading appears as dark regions surrounded by lighter skin. The dark regions also include eyebrows. The contrast between the dark and light areas is used to locate and identify eye regions.

The contrast is used as follows. First, the pixels are tested against a first threshold, e.g., 50.0 of 255, and if they are above the first threshold (50), the pixels are declared to be part of the facial region.

Next, those pixels determined to be in the face region are tested against a second threshold, e.g., 70.0 of 255. In the second test, those pixels below the second threshold are declared to be part of the eyes.

As a result of these two tests on the blurred image, first the pixels that are part of the facial region are determined, and the pixels within the facial region that are part of the eyes are determined, at least in the limited search region where the eyes are likely to be located.

Eliminating Eyebrows

After these regions are located in the blurred image, processing returns to the original image. The original image is examined at the eye locations to determine where the eyebrows are located. In the original image, the eyes and eyebrows can be detected easily. The next step 13 is to remove eyebrows. Again, relative position is used. Eyebrows are always above and separate from eyes; therefore, they can be easily eliminated. This is accomplished by noting that the pixels are essentially in two groups, one below the other for each eye. The pixels in the top group are simply eliminated under the assumption that they are part of the eyebrows rather than the eyes The remaining regions are the eyes.

Segmenting the Eyes

Once the eyes have been determined, one must extract the eye parameters, however, to do so one must separate the eyes into their constituent parts. In this step, the eyes are segmented into three parts: the iris, the corners, and the whites. This segmentation is based on intensity according to the following equation:

$$s(x, y) = \begin{Bmatrix} \text{eye white} & \text{if } g(x, y) > T \\ \text{iris, corner} & \text{otherwise} \end{Bmatrix}$$

where T is a preset threshold and s(x, y) is the segmented image. Human irises are different colors; however, the remainder of the eyes is white. As white pixels have a value of 255, black pixels have a value of 0 and pixels in between have a value in between, the threshold T is set high enough to separate the irises from the white pixels. This segments the irises from the white parts of the eyes and the corners. In one embodiment of the present invention, the threshold T used is 85 of 255.

In addition, the eye corners are identified as dark regions. Then, the intensity of the eye corners and irises are reversed, i.e., the eye corners are labeled at intensity 255 and the whites at intensity 0 to make them easily identifiable.

Extracting Eye Parameters

Figure 2:
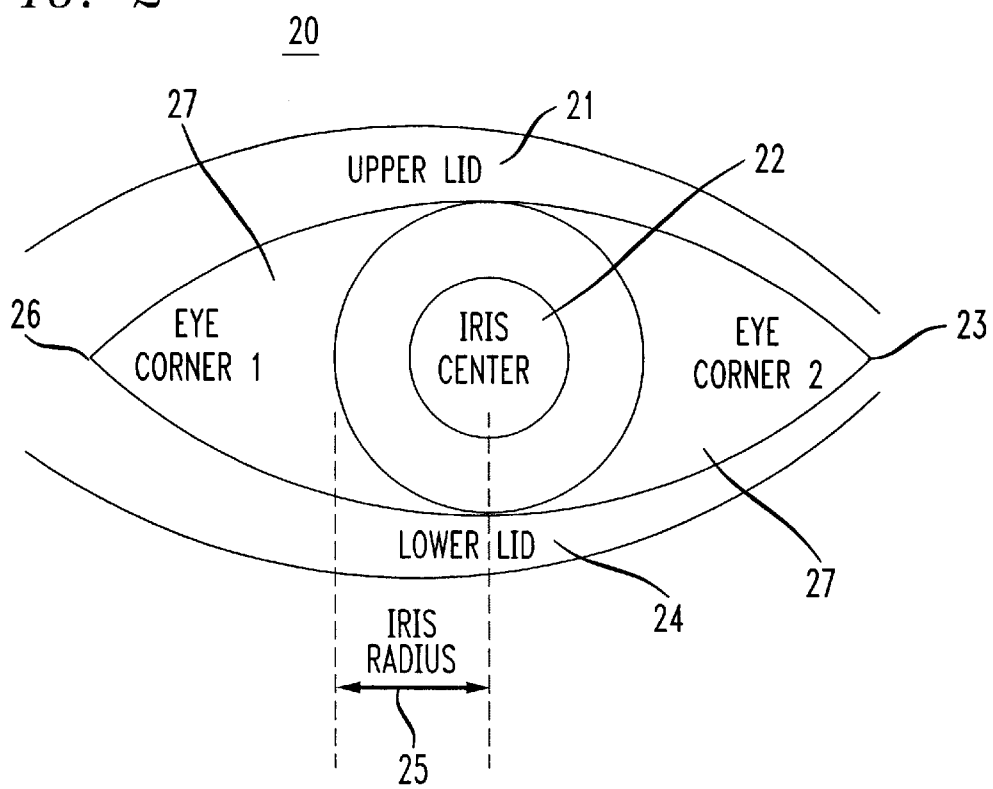
FIG. 2 depicts the eye parameters extracted by the method of the present invention.
Figure 3A:
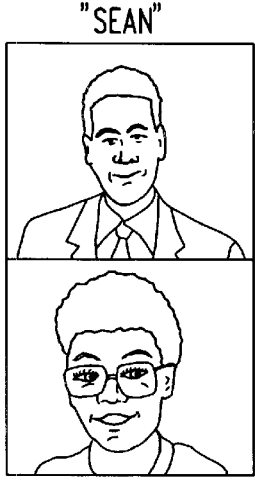
FIGS. 3(a)–(d) depict the results of eye segmentation according to the method of the present invention.
Figure 3B:
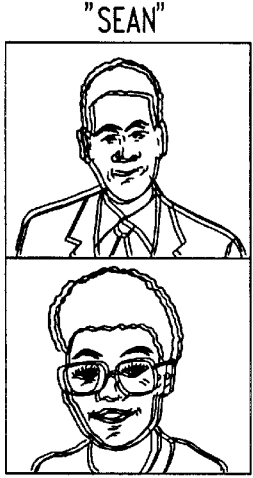
Figure 3C:
Figure 3D:
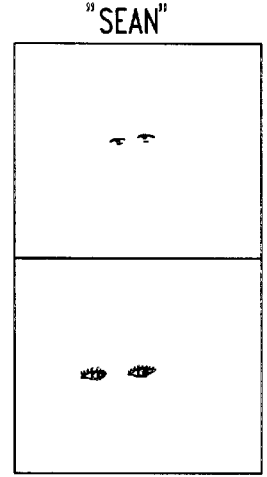

In the next step 15, the eye parameters are extracted. In this work, iris radius 25, iris center position 22, and four eyelid positions (both corners 23, 26 and upper and lower lids 21, 24) are found. See FIG. 2. The eye regions are scanned from left to right, top to bottom. The eye corners 23, 26 are the left-most and right-most white pixels (reversed from their normal color) and the upper 21 and lower lids 24 are the top-most 21 and bottom-most white pixels 24 in each eye regions. The white pixels making up the iris 22 are separated from the corners 23, 26 by black pixels, which represent the eye whites 27. This separation makes iris width and height measurements easy. The position of the iris center is calculated from width and height of the white pixels. That is, the center of the iris is exactly the center of the width and height of the white pixels. The iris radius is half the width of the white pixels. These determined eye parameters are useful for gaze detection and eye syntheses.

Results

FIGS. 3(*a*)–(*d*) show the result of this algorithm. In FIG. 3(*a*), the original image is shown. The blurred image is shown in 3(*b*). Note the dark eye regions. A box is drawn around the selected region in 3(*c*). After removal of the eyebrows, the eyes are segmented in 3(*d*). The white regions indicate the irises and eye corners. The gaps in each eye are the white regions.

TABLE 1 shows the extracted parameters from the figures.

| Parameter | Sean | | Sandy | |
| --- | --- | --- | --- | --- |
| | Left Eye | Right Eye | Left Eye | Right Eye |
| Radius | 3 | 3 | 4 | 3 |
| Iris Center | (63,76) | (60,94) | (122,117) | (124,164) |
| Eye Corners | (63,66) | (60,78) | (122,105) | (124,149) |
| | (63,79) | (60,97) | (122,121) | (124,167) |
| Eyelid, upper | (61,76) | (60,94) | (116,117) | (116,164) |
| Eyelid, lower | (65,76) | (60,94) | (136,117) | (134,164) |

System for Implementing the Method

Figure 4:
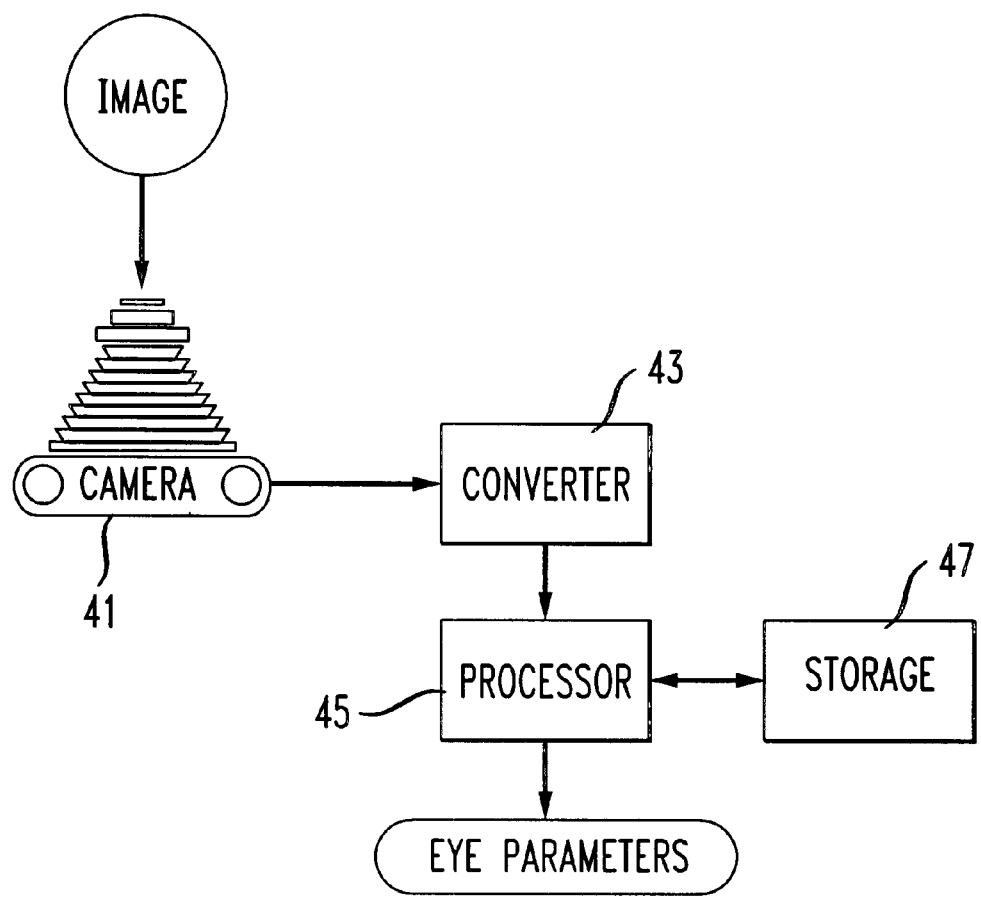
FIG. 4 depicts a block diagram of an apparatus for implementing the method of the present invention.

Turning to FIG. 4, to implement the method of the present invention, a camera 41 is used to capture the image. The camera 41 outputs the image to a converter 43, which converts the captured image to pixels.

The digital image is then passed to a processor 45, such as a dedicated computer, which could be a Sun SparcStation, for example. Each of the steps of the method of the present invention car be implemented as a separate subroutine and executed as calls to the subroutine, or as part of a single program.

The processor 45 then blurs the image using the Gaussian filter, determines the location of the two eye regions, in the blurred image, eliminates the eyebrows from the image, segments the eyes into their constituent parts, and then extracts the plurality of eye parameters. These parameters are then placed in a file in storage 47 for later retrieval or further processing, such as reorientation of the direction of eye contact according to known techniques.

What is claimed is:

1. A method for locating eyes in an image, comprising the steps of:
   a) spatially blurring the image with a Gaussian filter to form a blurred image;
   b) determining a location of two eye regions in the blurred image;
   c) eliminating eyebrows in the two eye regions in the original image based on the location of the two eye regions obtained in step b) from the blurred image, thereby forming a first processed image;
   d) segmenting the eyes in the first processed image; and
   e) extracting an iris location from the first processed image.

2. The method according to claim 1, wherein said Gaussian filter is a function, h(x, y), such that $$g(x, y) = \frac{1}{\sum h(x, y)} \sum_x \sum_y f(x, y) h(x, y)$$

where g(x, y) is the resulting image and ƒ(x, y) is the original image.

3. The method according to claim 2, wherein the gaussian filter, h(x,y), is defined as follows:

$$h(x, y) = \begin{bmatrix} 2 & 2 & 3 & 4 & 5 & 5 & 6 & 6 & 6 & 5 & 5 & 4 & 3 & 2 & 2 \\ 2 & 3 & 4 & 5 & 7 & 7 & 8 & 8 & 8 & 7 & 7 & 5 & 4 & 3 & 2 \\ 3 & 4 & 6 & 7 & 9 & 10 & 10 & 11 & 10 & 10 & 9 & 7 & 6 & 4 & 3 \\ 4 & 5 & 7 & 9 & 10 & 12 & 13 & 13 & 13 & 12 & 10 & 9 & 7 & 5 & 4 \\ 5 & 7 & 9 & 11 & 13 & 14 & 15 & 16 & 15 & 14 & 13 & 11 & 9 & 7 & 5 \\ 5 & 7 & 10 & 12 & 14 & 16 & 17 & 18 & 17 & 16 & 14 & 13 & 10 & 7 & 5 \\ 6 & 8 & 10 & 13 & 15 & 17 & 19 & 19 & 19 & 17 & 15 & 13 & 10 & 8 & 6 \\ 6 & 8 & 11 & 13 & 16 & 18 & 19 & 20 & 19 & 18 & 16 & 13 & 11 & 8 & 6 \\ 6 & 8 & 10 & 13 & 15 & 17 & 19 & 19 & 19 & 17 & 15 & 13 & 10 & 8 & 6 \\ 5 & 7 & 10 & 12 & 14 & 16 & 17 & 18 & 17 & 16 & 14 & 13 & 10 & 7 & 5 \\ 5 & 7 & 9 & 11 & 13 & 14 & 15 & 16 & 15 & 14 & 13 & 11 & 9 & 7 & 5 \\ 4 & 5 & 7 & 9 & 10 & 12 & 13 & 13 & 13 & 12 & 10 & 9 & 7 & 5 & 4 \\ 3 & 4 & 6 & 7 & 9 & 10 & 10 & 11 & 10 & 10 & 9 & 7 & 6 & 4 & 3 \\ 2 & 3 & 4 & 5 & 7 & 7 & 8 & 8 & 8 & 7 & 7 & 5 & 4 & 3 & 2 \\ 2 & 2 & 3 & 4 & 5 & 5 & 6 & 6 & 6 & 5 & 5 & 4 & 3 & 2 & 2 \end{bmatrix}.$$

4. The method according to claim 1, wherein the step b) of determining further comprises limiting a search for the location of the eye regions to a central region of the original image.

5. The method according to claim 1, wherein the step b) of determining further comprises detecting a contrast between dark and light areas to identify eye regions.

6. The method according to claim 1, wherein the step c) of eliminating further comprises removing dark pixels at a top section of the eye regions.

7. The method according to claim 1, wherein the step of segmenting further comprises segmenting the eyes into three parts: the iris, the corners, and the whites.

8. The method according to claim 1, wherein the step of segmenting further comprises segmenting the eyes based on intensity.

9. The method according to claim 8, wherein the step of segmenting further comprises segmenting the eyes according to the following function:

$$s(x, y) = \begin{cases} \text{eye white} & \text{if } g(x, y) > T \\ \text{iris, corner} & \text{otherwise} \end{cases}$$

where T is a preset threshold and s(x, y) is the segmented image.

10. The method according to claim 9, wherein the threshold T is set high enough to segment all iris colors, but low enough to segment all white areas.

11. The method according to claim 9, wherein the step of segmenting further comprises reversing the intensity of the eye corners, irises and whites at intensity.

12. The method according to claim 1, wherein the step of extracting further comprises:
   (1) scanning the eye regions from left to right, and from top to bottom;
   (2) identifying the corners as the left-most and right-most white pixels;
   (3) identifying the upper and lower lids as the top- and bottom-most white pixels in each eye region.

13. The method according to claim 12, wherein the step of extracting further comprises:
   (1) calculating a width and height of white pixels that are separated from the corners by black pixels, which represent the eye whites;
   (2) determining a center of the iris from the width and height; and
   (3) determining the iris radius by dividing the width in half.

14. An apparatus for locating eyes in an image, comprising:
   a) a digital camera capturing the image and converting the image into a plurality of pixels;
   b) a processor being coupled to the digital camera and performing the steps of:
      (1) spatially blurring the image with a Gaussian filter to form a blurred image;
      (2) determining a location of two eye regions in the blurred image;
      (3) eliminating eyebrows in the two eye regions in the original image based on the location of the two eye regions obtained in step (2) from the blurred image, thereby forming a first processed image;
      (4) segmenting the eyes in the first processed image; and
      (5) extracting an iris location from the first processed image.

15. The apparatus according to claim 14, wherein said Gaussian filter, h(x, y), operates according to the following equation:

$$g(x, y) = \frac{1}{\sum h(x, y)} \sum_x \sum_y f(x, y) h(x, y)$$

where g(x, y) is the resulting image and ƒ(x, y) is the original image.

16. The apparatus according to claim 14, wherein the processor limits its scan to a central region of the image in its search for the location of the eye regions.

17. The apparatus according to claim 14, wherein the processor segments the eyes using the following function:

$$s(x, y) = \begin{cases} \text{eye white} & \text{if } g(x, y) > T \\ \text{iris, corner} & \text{otherwise} \end{cases}$$

where T is a preset threshold and s(x, y) is the segmented image.

18. The apparatus according to claim 14, wherein the processor extracts the parameters by:
   (1) scanning the eye regions from left to right, and from top to bottom;
   (2) identifying the corners as the left-most and right-most white pixels;
   (3) identifying, the upper and lower lids as the top- and bottom-most white pixels in each eye region.

19. The apparatus according to claim 18, wherein the processor further extracts the parameters by:
   (1) calculating a width and height of white pixels that are separated from the corners by black pixels, which represent the eye whites;
   (2) determining a center of the iris from the width and height; and
   (3) determining the iris radius by dividing the width in half.

20. An apparatus for detecting eyes in an image, comprising:
   a) means for capturing the image;
   b) means for converting the image into a plurality of pixels being coupled to the capturing means;
   c) a processor being coupled to the means for converting and receiving the plurality of pixels, and including:
      (1) means for spatially blurring the image with a Gaussian filter to form a blurred image;
      (2) means for determining a location of two eye regions in the blurred image;
      (3) means for eliminating eyebrows in the two eye regions in the original image based on the location of the two eye regions obtained by said determining means, thereby forming a first processed image;
      (4) means for segmenting the eyes in the first processed image, and
      (5) means for extracting an iris location from the first processed image.

21. The apparatus according to claim 20 wherein the means for capturing comprises a camera and the means for converting comprises a digital to analog converter.

22. A method for locating eyes in an image, comprising:
   spatially blurring the image with a Gaussian filter to form a blurred image;
   predicting a probable location of iris regions in the blurred image, based on the location of other facial features;
   within a window surrounding the probable location of iris regions, identifying light-to-dark transitions; and
   extracting an iris location based on the identified transitions.

* * * * *